Figure 1:
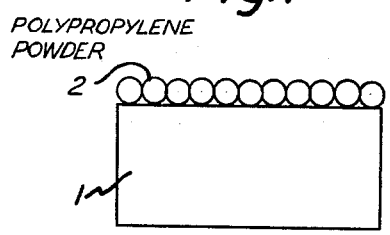

June 2, 1964  F. RANALLI  3,135,622
PROCESS OF COATING POLYPROPYLENE
Filed June 22, 1959

POLYPROPYLENE POWDER

COLORING MATERIAL

EMBEDDED COLORING MATERIAL

THIN POLYMER FILM

INVENTOR
FRANCO RANALLI

BY Toulmin & Toulmin
ATTORNEYS

United States Patent Office 

Patented June 2, 1964

3,135,622
PROCESS OF COATING POLYPROPYLENE
Franco Ranalli, Ferrara, Italy, assignor to Montecatini Societa Generale per l'Industria Mineraria e Chimica, a corporation of Italy
Filed June 22, 1959, Ser. No. 821,895
Claims priority, application Italy June 26, 1958
10 Claims. (Cl. 117—47)

The present invention relates to a process and products produced thereby for improving the receptivity of resinous materials to printing and other decorative finishes.

More particularly, this invention is directed to shaped objects made from alpha olefins and, more specifically, from polypropylene.

In recent years, thermoplastic materials, having excellent properties and economic advantages, have been extensively fabricated into a multitude of diverse articles. One of the most troublesome problems with respect to these articles has been the fact that coloring matter as used in inks etc. could not be printed with sufficient permanence to the satisfaction of the manufacturers and consumers. This problem has been even more acute in the printing of manufactured articles made of olefin polymers, wherein besides having a non-porous structure characteristic of all synthetic resins, olefin polymers have surfaces completely devoid of reactive groups capable of bonding chemical substances.

An object of this invention is to form an indelible, permanent, decorative surface on manufactured articles made from all kinds of materials, particularly polyolefins, and more specifically, polypropylene.

Another object of this invention is to modify the surface of polypropylene in order to make it easily adherent to films of dissimilar thermoplastic materials.

A further object of this invention is to provide articles which have permanent coloring matter on a white background and are protected from scratches.

Other objects and advantages of this invention will become apparent upon further study of the specification and accompanying drawings, wherein FIGURES 1 through 4 are end views of a polypropylene base modified by the process of this invention.

The objects of this invention can be accomplished by a series of steps as follows:

(1) Forming on a resinous material an adherent coating of thermoplastic powder, said powder capable of being miscible with the resinous material, thereby being capable of forming a unitary solid phase.

(2) Applying coloring matter on said thermoplastic powder.

(3) Fusing said coloring thermoplastic powder into said resinous material to form a unitary structure or solid phase, having an indelible coloring surface.

Naturally, if the powder and the resinous material are composed of essentially identical compositions, it is likely that they will form a single solid phase by fusion.

With respect to the polypropylene aspect of this invention, it has been surprisingly discovered that when polypropylene, having a certain structural composition, is contacted with certain solvents, only a minute surface layer of said polypropylene is dissolved. It has also been discovered that these solvents can be extracted from the surface layer by means of a second solvent, non-reactive with polypropylene, and that this extraction step leaves a finely divided precipitate of powdery polypropylene adhering to the surface. It has been further discovered that all types of inks and dyes penetrate this powdery layer, thereby resulting in easily decoratable surfaces. It has been even further discovered that this coloring powdery layer can be heated to a temperature sufficient to fuse within the solid polypropylene to form a unitary structure having a permanently and indelibly decorated surface. A more specific description of this aspect of the invention is as follows, with particular reference to the drawings.

It has been found that such solvents corresponding to the formula $$R_1(COO-R_2)_n$$

wherein $R_1$ and $R_2$ correspond to the radicals selected from the group consisting of alkyl, aryl and alkylaryl, and wherein $n$ is an integer at least as high as 1, when contacted with certain polypropylenes at temperatures up to 120° C. have no apparent solvent action, but, on the other hand, these solvents do, in fact, dissolve a very thin surface layer of polymer.

It has been found in particular that diactyadipate, di-2-ethylhexyl phthalate, triethyleneglycol, di-2-ethylbutyrate and triethyleneglycol di-2-ethylhexoate work very satisfactorily.

When this solubilized layer of polymer is then contacted with a solvent which extracts the organic ester but has no effect on polypropylene, a finely divided powdery surface is obtained. For purposes of illustration, in FIGURE 1, the reference numeral 1 refers to solid polypropylene, and reference numeral 2 shows a highly magnified picture of the powder. It is obvious that there are a great many solvents which can dissolve organic esters while not attacking polypropylenes. In particular, acetone, methanol, and methylethylketone work very satisfactorily.

It is to be pointed out that solvents which dissolve polypropylene at temperatures as low as 80° C., such as hydrocarbons and some chlorinated solvents, are not useful for the above steps.

It is to be noted that the method can be applied to solid polypropylene comprising isotactic macromolecules and having any degree of polymerization provided that the residue from the extraction with boiling heptane (isotactic macromolecule content) is higher than 70%, preferably higher than 80%. This limitation is necessary because, if the content of amorphous (atactic) macromolecules present in the polypropylene exceeds an upper limit, there is no precipitation of a layer of a finely divided powder, but instead a tacky continuous film is produced, i.e., a film of gelatine layer. In this connection it is to be noted that isotactic is a term now extensively employed by the art, and was adopted by G. Natta to define a specific type of stereoregular structure, macromolecules having substantially that type of structure, and polymers made up of the isotactic macromolecules, which were invented and discovered by him and his co-workers (see, e.g. J.A.C.S., vol. 77, p. 1709, March 20, 1955; Patent No. 2,882,263).

A practical method for establishing the limit of utilization of polypropylene for this purpose consists in immersing a thin sheet of polymer into acetone at room temperature (20–30° C.) for 30 minutes. The surface of the sheet subjected to this treatment should not appear tacky or altered in any way.

Figure 2:
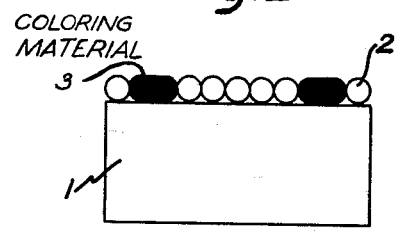
Figure 3:
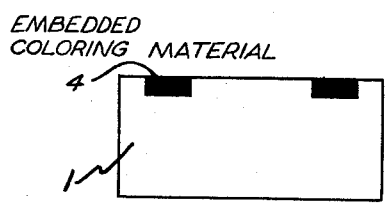

In FIGURE 2, ink or dye is applied to the powder layer and penetrates the voids in the powder, thereby forming distinct lines as shown by the reference numeral 3. It is to be noted that any type of ink or film-forming substance will be suitable for decorating the porous layer. For example, oil or alcohol based inks and China ink, as well as ball point pen inks have been found to be very satisfactory.

The colored powdered layer remains temporarily fixed, until the last step of permanent fixing of the coloring. The preferred method for permanent fixing is to melt the porous powdery layer containing the coloring matter with conventional equipment, such as a gas burner, thereby resulting in a product as demonstrated by FIGURE 3, wherein reference numeral 4 shows that the coloring matter is embedded within the surface of the polypropylene and that the powdery layer has disappeared, thereby restoring the original surface.

The advantages and practicality of this invention can be more readily appreciated by the following consideration of the operating conditions.

(a) The time needed for the surface solubilization varies from a few seconds at 155–170° C. to a few minutes at 140° C. Obviously, heat transfer variables, such as time and temperature, will be selected in relation to the shape of the article to be treated.

(b) The most time-consuming step of the operation is in the removal of the ester from the porous surface. This time depends on the solvent used (e.g., acetone or methanol, or methylethylketone) and on the other operating conditions, but it is, in general, a matter of minutes.

(c) The heat treatment of polypropylene articles involves only the surface layer and therefore need not cause any distortion of the mass; for most heating techniques, temperatures not higher than about 180° C. are observed, however, flash or radiant heating techniques can utilize higher temperatures. The time needed for restoring the surface amounts to only a few seconds.

As can be readily appreciated, this invention is highly amenable to continuous operation. The best results are obtained where the process is applied to smooth homogeneous surfaces, such as extruded sheets and films. However, with some slight modifications, the above process can also be successfully utilized for the decoration of all shapes of articles produced by all types of processes, such as compression and injection molding and extrusion. With respect to injection molded articles, when used in the process as described above, there is a non-homogeneous solvent penetration in the surface layer of the product, thereby revealing creep lines and sealing lines of the material. This phenomenon can be overcome by the following technique.

Instead of using a relatively pure organic ester as the first solvent, it has been found that by incorporating a relatively low percentage of polypropylene in the organic ester and using a temperature of about 170° C. for solvent contact, a uniform surface of powder was ultimately produced by following the remaining steps, as described above.

Another problem in utilizing the process of this invention is met when complex geometrical shapes are modified. As can be appreciated, solvent action is dependent on the local surface temperature of the article, and because complex geometrical shapes have non-uniform heat transfer characteristics, the penetration of the solvent is also non-uniform, i.e., the thicker the article, the slower the solvent attack. This difficulty can be largely overcome by preheating the entire article to a temperature of a few degrees lower (5–20° C.) but approximating the temperature at which the solvent attack is usually conducted (140–180° C.). In this way, the effect of heat transfer dissimilarities is greatly mitigated.

As an alternative to melting the powdered layer in one step, the powdered layer can be treated with a solution of tetrahydronaphthalene or any other volatile aromatic hydrocarbon, capable of acting as a solvent for polypropylene at above room temperature. In this way, the powdered layer is dissolved in the solvent and then the product is processed in an oven kept at about 130° C., where the solvent is evaporated and the surface thus restored. Although this process seems to be more complicated and less practical than simple melting, it can be of interest in some particular cases dependent on the type of manufactured article to be treated.

Figure 4:
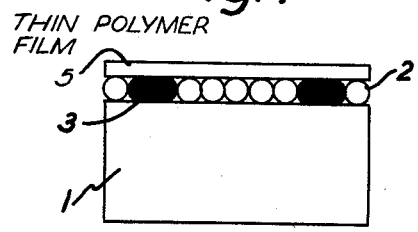

Another aspect of this invention resides in the production of white, non-transparent, pigment-free surfaces which can be obtained by the relatively simple expedient of replacing the melting step by a step wherein a coating of a transparent film of resin is placed on the powdery surface. If this film is applied prior to decoration, then this film itself can be decorated by inks which are selective for its surface. For example, a powdered product can be immersed in a solution of polystyrene or Epikote (the epoxy resins produced by the Shell Oil Company), and after the solvent is evaporated, the use of polystyrene or Epikote-selective inks can adequately decorate the surface. On the other hand, if the powdered surface is itself decorated prior to the application of the film, the ink and powder are thereby protected, as can be seen in FIGURE 4, wherein the reference numeral 5 designates the thin protective film.

With particular reference to the polypropylene aspect of this invention, the powdery surface usually consists of particles of from 1 to 30 microns, having a molecular weight higher than 50,000 and made up, for at least 70%, of isotactic macromolecules non-extractable with boiling n-heptane.

In addition to utilizing the principles of this invention in decorating surfaces using inks, it is also possible to utilize the tetralin type solvent as a decorating medium; more explicitly, the tetralin type solvent can be used to write on the powdered surfaces, and by careful control of heating a white background with transparent writing can be produced. In a way, this would resemble a water mark as seen on paper.

The following specific embodiments of this invention are intended to be merely exemplary and not limitative to the scope of the appended claims.

*Example I*

A turquoise blue polypropylene sheet of 2 mm. thickness, formed by either compression molding or extrusion, is immersed into di-2-ethylhexyl phthalate (D.O.P.) kept at 150° C. for 60 seconds. The sheet is then withdrawn and subsequently immersed in acetone for 3 minutes. After this step, the sheet is exposed to air to allow the acetone to evaporate. The resultant sheet is observed to have a continuous deposit of porous and adherent white powder on which it is easy to write with any type of ink, dissolved in any type of solvent. Very good results were obtained, e.g., with China ink or with ball point pen inks.

After the writing or decorating has been applied, the surface of the sheets is contacted with the hot gases from a conventional short-flame gas burner for a sufficient time to restore the original unpowdered surface.

The melting time is obviously dependent on the type of burner and on the general operating conditions; however, restoration of the surface is usually accomplished in the range of fractions of a second to a number of seconds. The film then contains the ink indelibly and permanently fixed in the surface.

*Example II*

Sheets having a thickness varying from 0.1 to 3 mm., obtained from polypropylene having a molecular weight of 150,000 and 85% isotactic macromolecules content, were contacted with D.O.P. at temperature varying from 140 and 160° C. for times of between 5 seconds and 5 minutes. After the phthalate was removed with acetone and the sheet dried, writing was put on the white porous surface with commercial inks of various types. The surface was then subjected to the flame treatment yielding excellent products, similar to those obtained in Example I.

*Example III*

An injection-molded polypropylene sheet (2 x 3 x ⅛ in.) was immersed in D.O.P. for variable times and at temperatures within the ranges stipulated in Example II. It was discovered that it was impossible to obtain a homogeneous layer of stratified powder, without at the same time subjecting the sheet edges to severe solvent action.

This problem was solved by incorporating about a 3% polypropylene concentration in the octyl phthalate (D.O.P.). With this solution and at a contact temperature of 170° C., a surface film of precipitated polymer was obtained on which it was possible to write and then flame-treat, as described in Example I. The surface of the resultant product was uniform in all respects.

*Example IV*

A process similar to that of Example III was carried out on an egg-holder obtained by injection molding at 290° C. with a cycle of 1 minute, a polypropylene with a molecular weight of 120,000 and having an isotactic macromolecules content of 90%.

From various experiments carried out on objects obtained from various materials (polypropylene with a molecular weight comprised between 80,000 and 250,000) under different shaping conditions, it was found that the best results are obtained on articles shaped at high temperatures and made of a polymer having a high heptane residue.

*Example V*

The following process is useful in preserving the white surface obtained by precipitation of the polypropylene.

A lamina of polypropylene having a molecular weight of 200,000 and an isotactic macromolecules content of 90%, treated with D.O.P. and then with acetone as in Example I, is printed with an ink insoluble or slightly soluble, after drying in ketone and/or benzenic solvents. The ink is dried and the lamina is then immersed into a solution of any transparent resin, such as polystyrene, in methyl-ethylketone and/or benzene or homologous solvents.

The concentration of the film-forming substance can be varied and therefore can be adjusted to obtain the optimum process and product for a given set of conditions. In this example, a 8% polystyrene solution in methylethylketone was used at between room temperature and 60° C.

After evaporation of the solvent, a continuous layer of the film is obtained which protects the printed polypropylene sheet from scratches and from the removal of ink.

This process is particularly suitable for obtaining polypropylene sheet having the appearance of a perfectly flexible, white paper.

*Example VI*

A modification of Example V consists of forming the protective film of polystyrene on the treated surface and then writing on the polystyrene film with inks which can adhere to it. In this way, the production of the powdered polypropylene surface layer, according to the invention, serves as an adhesive without which the polystyrene film could not be anchored.

*Example VII*

A polypropylene sheet is treated as in Example I but without the last stage involving surface melting with hot gases.

The sheet is placed in a vacuum molding press having heating means, and while the sheet is being softened for shaping, the surface of the sheet is satisfactorily melted to provide an indelibly inked shaped article.

In designing an inked shaped article, the size variations which the piece will undergo during the shaping must obviously be compensated for.

*Example VIII*

The polypropylene sheet to be vacuum-molded by the technique described in the preceding example can be coated with a very thin layer of polystyrene or another resin according to Example V, in order to prevent the polymer surface from being scratched during storage.

*Example IX*

4 polypropylene sheets with a thickness of 2 mm. are immersed in di-octyl adipate at 150° C., in Flexol GH (triethylene glycol di-2-ethylbutyrate) at 150° C., in Flexol 3 GH (triethylene glycol di-2-ethylhexoate) at 150° C., and in a mixture of di-octyl phthalate (D.O.P.) and ethylbenzene in the ratio of 1:1 at 145° C., respectively. After immersion for a sufficient period of time the sheets are withdrawn from the baths containing the afore-mentioned esters and are washed with acetone. In the surface of said sheets a powdery layer is formed, similar to that obtained by using pure D.O.P.

*Example X*

A polypropylene lamina previously treated with D.O.P. and acetone as in Example I, is printed with an ink insoluble in aromatic solvents. Instead of restoring the treated surface by melting, the lamina is immersed, at room temperature, in a solution of tetrahydronaphthalene and/or another volatile aromatic hydrocarbon, capable of acting as a solvent for polypropylene at a temperature higher than room temperature. The lamina is kept immersed until its powdered surface is impregnated with solvent, and then placed in an oven kept at 130° C. where the solvent will dissolve the polypropylene powder layer which jellifies in the form of a continuous film. Any remaining solvent is then evaporated, and the surface thus restored.

In this process, it is important that the rate of evaporation of the solvent be sufficiently slow in order to ensure a homogeneous melting of the surface film.

*Example XI*

Example I is repeated, except that the initial surface of the manufactured article is restored by keeping the article in air at temperatures higher than 160° C. or by exposing the surface to a suitable source of radiant or conventional heat or to a heat source of the mixed type for the time required to restore the surface.

In general, the heating of the ester or of the treated surface can be accomplished with any type of heating, provided that the heating temperatures and time ranges are selected in substantial accordance with the preceding disclosure.

It is understood that the inventor intends to claim, as a part of his invention, any variation, substitution and changes that lie within the scope of the invention and the hereinafter appended claims and intends to include within the scope of said claims such changes as may be apparent to those skilled in the art in the practice of the principles of this invention and within the scope as set forth in the hereinabove-stated specification.

It will be understood that the invention is susceptible to modification in order to adapt it to different usages and conditions, and, accordingly, it is desired to comprehend such modifications within the invention as may fall within the scope of the appended claims.

What I claim is:

1. A process for improving the receptivity to coloring materials selected from the group consisting of inks, dyes and pigments of a shaped article of polypropylene which comprises (1) contacting said shaped article with an organic ester solvent of the formula

wherein $R_1$ and $R_2$ each represents a member selected from the group consisting of alkyl, aryl and alkylaryl radicals and $n$ is an integer at least as high as 1, for a time sufficient to dissolve only a surface layer of said shaped article, (2) immersing said organic ester-treated shaped article in a second solvent which exhibits substantially no solvent action for the polypropylene, but which has solvent action for said organic ester solvent, thereby precipitating out a polypropylene powder, (3) and evaporating all solvents to obtain an adherent powdery layer of polypropylene on said shaped article, said powdery layer being highly receptive to coloring material and being fusible with said shaped article.

2. A process according to claim 1, wherein said organic ester is selected from the group consisting of dioctyl adipate, di-2-ethylhexyl phthalate, triethylene glycol di-2-ethylbutyrate and triethylene glycol di-2-ethylhexoate.

3. A process according to claim 1, wherein about 1–5% by weight of polypropylene is incorporated in said organic ester.

4. A process according to claim 1, wherein said second solvent is selected from the group consisting of acetone, methanol and methylethylketone.

5. A process according to claim 1, characterized by the additional steps of (4) applying coloring material selected from the group consisting of inks, dyes and pigments to said adherent powdery layer resulting from step (3), and (5) applying sufficient heat to said colored adherent powdery layer to melt it, thereby restoring the original surface of the shaped article and indelibly embodying said coloring material therein.

6. A process according to claim 5, wherein after said coloring material is applied to said adherent powdery layer, said adherent powdery layer is immersed in a volatile aromatic solvent for a sufficient time and at a sufficient temperature to transform the colored powdery layer into a film unified with said shaped article, and the aromatic hydrocarbon solvent is volatilized to restore the original surface of the polypropylene shaped article.

7. A process according to claim 1, wherein said polypropylene possesses a molecular weight above 80,000 and contains at least 70% of isotactic macromolecules non-extractable with boiling heptane.

8. A process according to claim 1, which comprises the additional step of applying a polymer film over said powdery layer.

9. A process according to claim 8, wherein the application of said polymer film is accomplished by coating said powdery layer with a dispersion of polystyrene.

10. A process according to claim 1, wherein the polypropylene shaped article is uniformly preheated prior to said step (1) to a temperature about 5° C. to 20° C. below the temperature at which step (1) is performed.

References Cited in the file of this patent

UNITED STATES PATENTS

| | | |
|---|---|---|
| 2,486,259 | Chavannes | Oct. 25, 1949 |
| 2,662,033 | Andrew | Dec. 8, 1953 |
| 2,882,263 | Natta et al. | Apr. 14, 1959 |
| 2,887,526 | Rudner | May 19, 1959 |
| 2,968,576 | Keller et al. | Jan. 17, 1961 |
| 2,971,858 | Giulio et al. | Feb. 14, 1961 |
| 2,973,241 | Scott et al. | Feb. 28, 1961 |